US010739532B2

(12) United States Patent
Xin et al.

(10) Patent No.: US 10,739,532 B2
(45) Date of Patent: *Aug. 11, 2020

(54) DRYING SYSTEM

(71) Applicants: Tyco Electronics (Shanghai) Co. Ltd., Shanghai (CN); TE Connectivity Corporation, Berwyn, PA (US)

(72) Inventors: Liming Xin, Shanghai (CN); Yun Liu, Shanghai (CN); Zhiyong Dai, Shanghai (CN); Lvhai Hu, Shanghai (CN); Dandan Zhang, Shanghai (CN); Roberto Francisco-Yi Lu, Berwyn, PA (US); Lei Zhou, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/981,139

(22) Filed: May 16, 2018

(65) Prior Publication Data

US 2018/0267254 A1  Sep. 20, 2018

Related U.S. Application Data

(63) Continuation of application No. PCT/IB2016/055538, filed on Sep. 16, 2016.

(30) Foreign Application Priority Data

Sep. 16, 2015  (CN) .......................... 2015 1 0589471

(51) Int. Cl.
*G02B 6/38* (2006.01)

(52) U.S. Cl.
CPC ................................. *G02B 6/3866* (2013.01)

(58) Field of Classification Search
CPC . G02B 6/3856; F26B 9/06; F26B 7/00; F26B 23/04; F26B 25/16
(Continued)

(56) References Cited

U.S. PATENT DOCUMENTS 3,953,265 A * 4/1976 Hood .................. H01L 21/6708
 438/8
7,232,262 B2 * 6/2007 Lytle ......................... B08B 3/02
 385/85

(Continued)

FOREIGN PATENT DOCUMENTS

JP  2003043298 A  2/2003
JP  2004109963 A  4/2004
WO  WO-2017046759 A1 *  3/2017  ........... G02B 6/3866

OTHER PUBLICATIONS

PCT Notification of Transmittal, The International Search Report and the Written Opinion of the International Searching Authority, or the Declaration, dated Nov. 2, 2016, 10 pages.
(Continued)

*Primary Examiner* — Stephen M Gravini
(74) *Attorney, Agent, or Firm* — Barley Snyder (57) ABSTRACT

A drying system comprises a drying box, a carrier moving and holding device, and a high pressure jet device mounted in the drying box. The carrier moving and holding device is configured to move a carrier into the drying box and hold the carrier in the drying box. A plurality of fiber optic ferrules are mounted on the carrier. The high pressure jet device is adapted to spray a high pressure gas on the carrier held in the drying box to dry the fiber optic ferrules.

24 Claims, 5 Drawing Sheets

(58) Field of Classification Search
USPC .......................................................... 34/202
See application file for complete search history.

(56) References Cited

U.S. PATENT DOCUMENTS

| | | | | |
|---|---|---|---|---|
| 7,437,834 | B2* | 10/2008 | Nakatsukasa | H01L 21/02052 |
| | | | | 34/381 |
| 7,797,855 | B2* | 9/2010 | Fukuoka | C30B 33/02 |
| | | | | 118/709 |
| 8,266,820 | B2* | 9/2012 | Nishimura | H01L 21/02052 |
| | | | | 118/58 |
| 9,964,358 | B2* | 5/2018 | Matsushita | H01L 21/67115 |
| 9,976,804 | B2* | 5/2018 | Hanawa | B01D 53/263 |
| 10,119,191 | B2* | 11/2018 | Morey | C23C 16/4408 |
| 2002/0081181 | A1 | 6/2002 | Yokomori et al. | |
| 2003/0102013 | A1* | 6/2003 | Jackson | B08B 7/0092 |
| | | | | 134/21 |
| 2005/0276558 | A1* | 12/2005 | Bianchi | G02B 6/381 |
| | | | | 385/134 |
| 2018/0267254 | A1* | 9/2018 | Xin | G02B 6/3866 |
| 2019/0247050 | A1* | 8/2019 | Goldsmith | A61B 17/00491 |

OTHER PUBLICATIONS

Abstract of JP2003043298, dated Feb. 13, 2003, 1 page.
Abstract of JP2004109963, dated Apr. 8, 2004, 1 page.

* cited by examiner

DRYING SYSTEM

CROSS-REFERENCE TO RELATED APPLICATIONS

This application is a continuation of PCT International Application No. PCT/IB2016/055538, filed on Sep. 16, 2016, which claims priority under 35 U.S.C. § 119 to Chinese Patent Application No. 201510589471.5, filed on Sep. 16, 2015.

FIELD OF THE INVENTION

The present invention relates to a drying system and, more particularly, to a drying system for drying a fiber optic ferrule.

BACKGROUND

A fiber optic connector generally comprises a housing and a fiber optic ferrule mounted in the housing. The fiber optic ferrule has a ferrule and an optical fiber inserted into a bore of the ferrule. A front end of the optical fiber protrudes from a front end face of the ferrule by a predetermined distance. The optical fiber is fixed in the bore of the ferrule by an adhesive filled in the bore of the ferrule.

After the optical fiber is fixed in the bore of the ferrule, the front end face of the fiber optic ferrule is processed. The processing of the front end face of the fiber optic ferrule generally includes polishing the front end face of the fiber optic ferrule, cleaning the polished fiber optic ferrule to remove the polishing powder from the fiber optic ferrule, drying the cleaned fiber optic ferrule, and wiping the front end face of the dried fiber optic ferrule to remove dust from the front end face of the fiber optic ferrule. The processing of the fiber optic ferrule is generally performed manually, which is inefficient and complicates maintaining quality processing. Furthermore, the fiber optic ferrule is easily damaged during manual processing.

SUMMARY

A drying system comprises a drying box, a carrier moving and holding device, and a high pressure jet device mounted in the drying box. The carrier moving and holding device is configured to move a carrier into the drying box and hold the carrier in the drying box. A plurality of fiber optic ferrules are mounted on the carrier. The high pressure jet device is adapted to spray a high pressure gas on the carrier held in the drying box to dry the fiber optic ferrules.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 1:
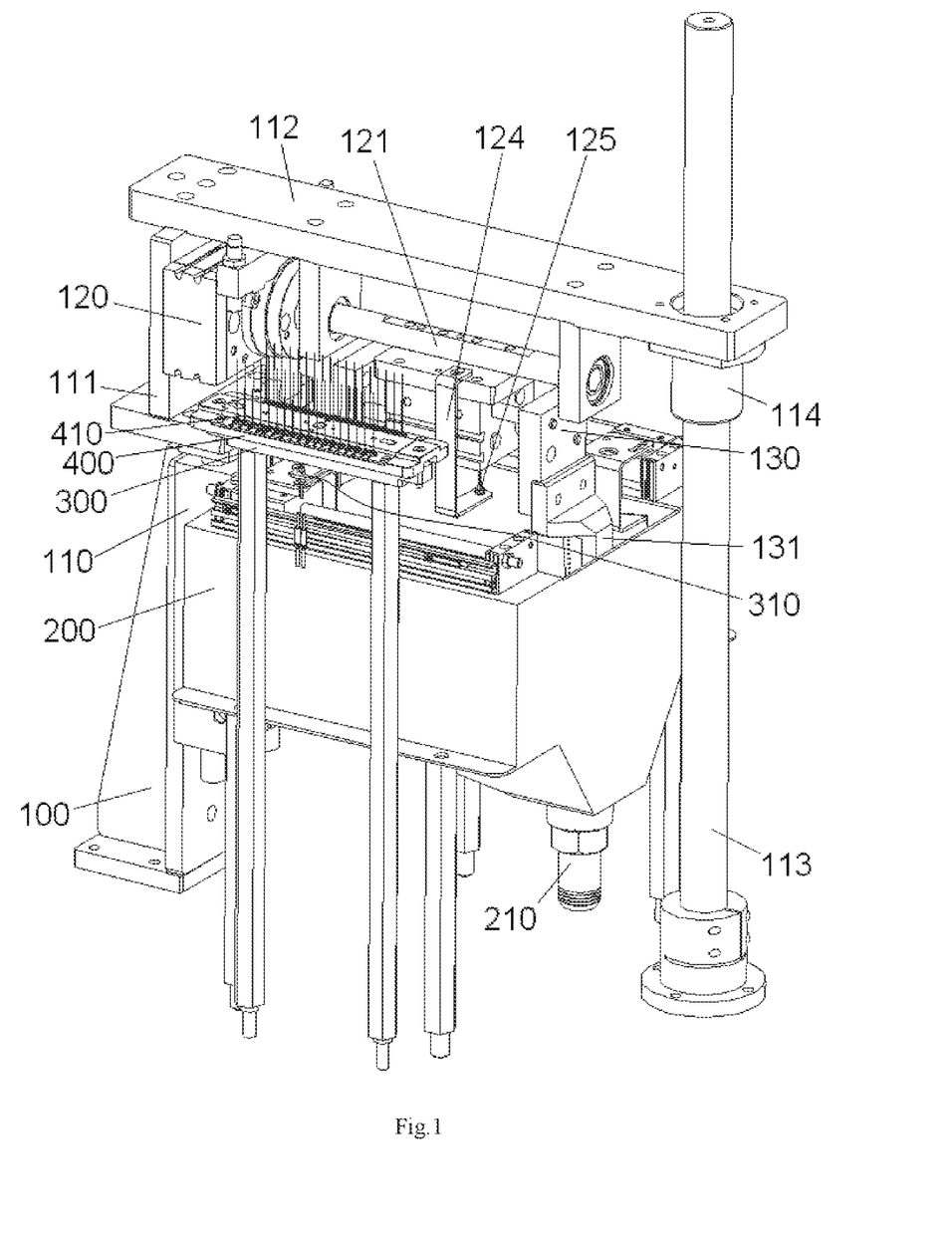
FIG. 1 is a perspective view of a drying system according to an embodiment.
Figure 2:
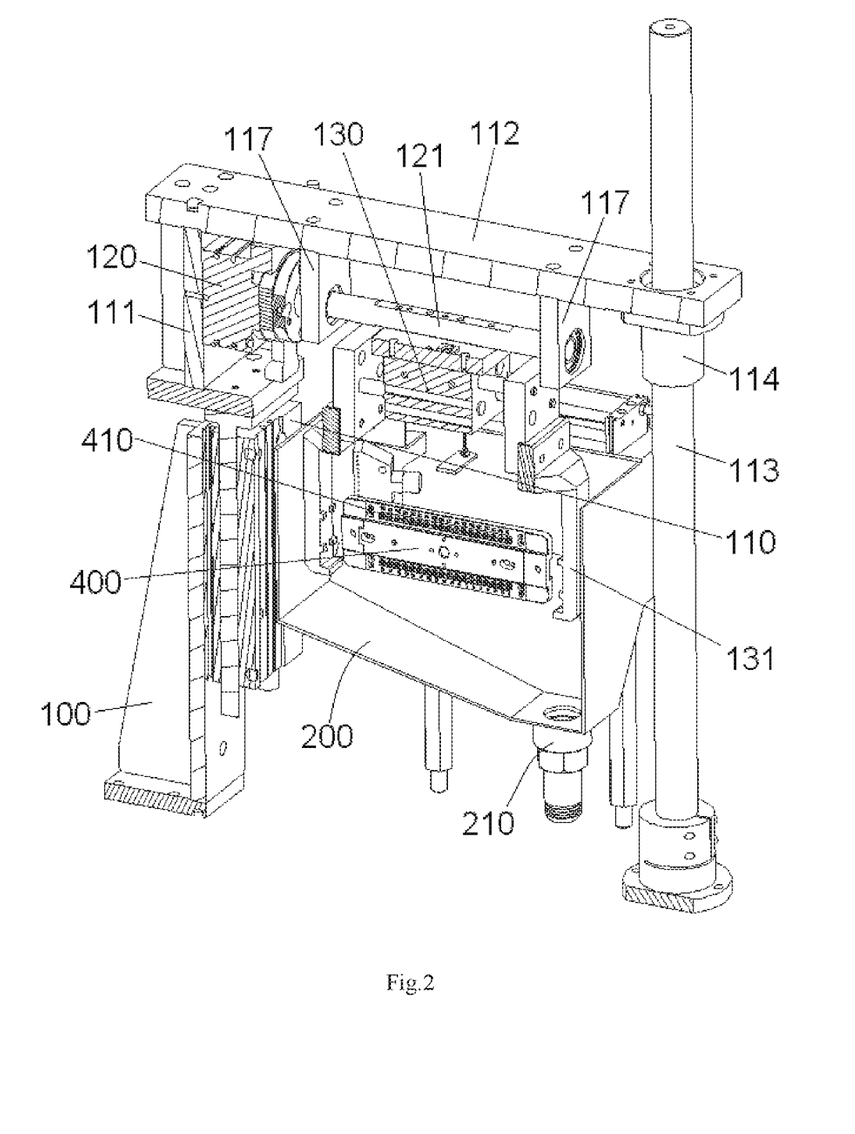
FIG. 2 is a sectional perspective view of the drying system.
Figure 3:
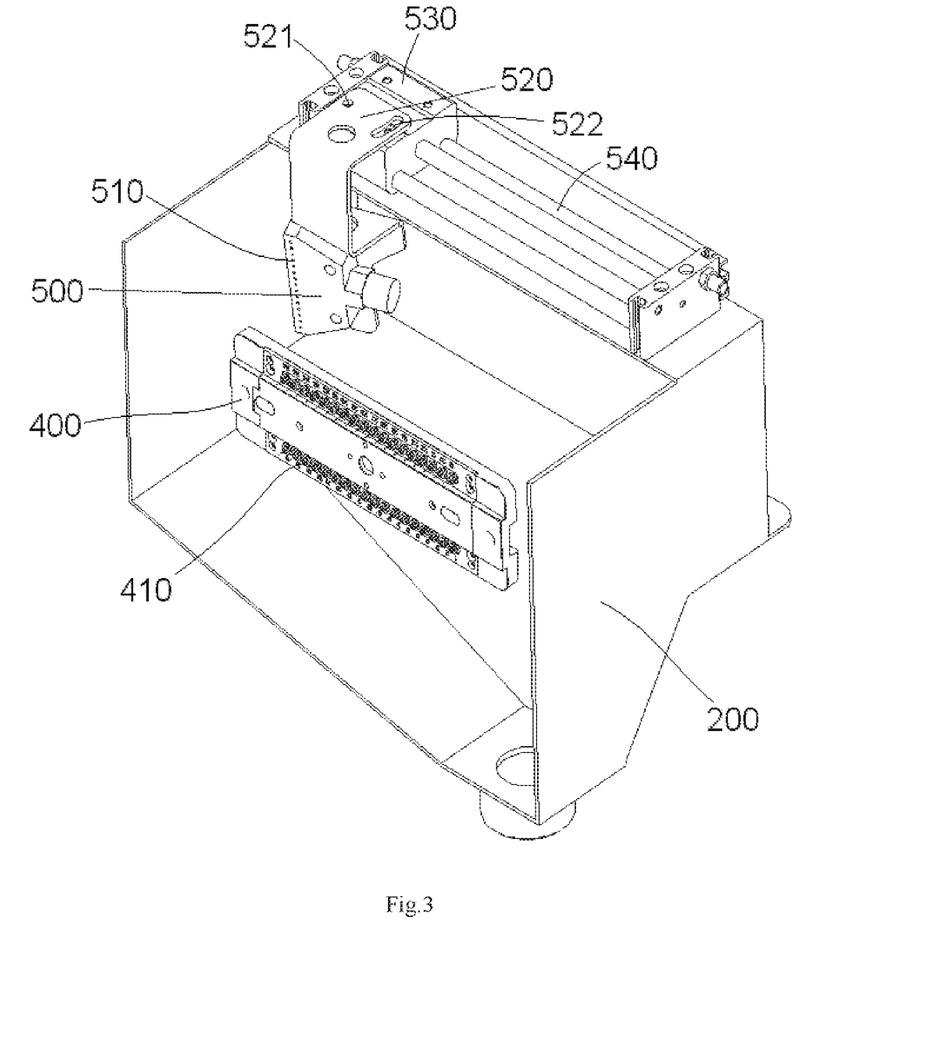
FIG. 3 is a perspective view of a high pressure jet device of the drying system.

A drying system adapted to simultaneously dry a plurality of fiber optic ferrules 410, which have been previously cleaned by a cleaning liquid, is shown in FIGS. 1-3. The drying system comprises a drying box 200, a carrier moving and holding device, and a high pressure jet device. The carrier moving and holding device is configured to move a carrier 400, on which the plurality of fiber optic ferrules 410 are mounted, into the drying box 200 and hold the carrier 400 in the drying box 200. The high pressure jet device is installed in the drying box 200 and adapted to spray a high pressure gas to the carrier 400 held in the drying box 200, the high pressure gas drying the fiber optic ferrules 410.

A plurality of rows of fiber optic ferrules 410 are mounted on the carrier 400, as shown in FIGS. 1 and 2. In this way, it is possible to dry all of the rows of fiber optic ferrules 410 on the carrier 400 simultaneously, improving efficiency in drying the fiber optic ferrules 410. The carrier 400 is held in the drying box 200 in a vertical posture parallel to a vertical plane, as shown in FIG. 2, during spraying the high pressure gas to the carrier 400.

The carrier moving and holding device, as shown in FIGS. 1 and 2, comprises a grabbing mechanism 130 adapted to grab the carrier 400, a moving mechanism adapted to move the grabbed carrier 400 into the drying box 200, and a support frame 100 configured to support the moving mechanism and the grabbing mechanism 130.

As shown in FIG. 1, the drying system comprises a carrier support table 300 configured to support the carrier 400 thereon. The fiber optic ferrules 410 and the carrier 400 are supported on the carrier support table 300. The carrier 400 is supported on the carrier support table 300 in a horizontal posture parallel to a horizontal plane.

A first sensor 310 is provided on the carrier support table 300 as shown in FIG. 1. The first sensor 310 is configured to detect whether the carrier 400 is placed on the carrier support table 300 as well as to detect a state of the carrier 400 on the carrier support table 300. The state of the carrier 400 may include a position and/or a posture of the carrier 400 on the carrier support table 300. The grabbing mechanism 130 correctly grabs the carrier 400 under the guide of the first sensor 310. In an embodiment, the first sensor 310 is a vision sensor, for example, a camera. The grabbing mechanism 130 is adapted to grab the carrier 400 to be dried from the carrier support table 300 and adapted to place the dried carrier 400 back on the carrier support table 300.

The moving mechanism, as shown in FIGS. 1 and 2, comprises a lift mechanism adapted to move the grabbing mechanism 130 in a vertical direction and a rotation mechanism adapted to rotate the grabbing mechanism 130. The lift mechanism moves the carrier 400 grabbed by the grabbing mechanism 130 into or out of the drying box 200 in the vertical direction. The rotation mechanism rotates the carrier 400 grabbed by the grabbing mechanism 130 to the horizontal posture or the vertical posture. The lift mechanism is mounted on the support frame 100. The rotation mechanism is mounted on the lift mechanism, so as to rise or fall together with the lift mechanism. The grabbing mechanism 130 is mounted on the rotation mechanism, so as to rotate together with the rotation mechanism.

The lift mechanism, as shown in FIGS. 1 and 2, comprises an installation frame 111, 112, a vertical rail 113 on which the installation frame 111, 112 is slidably mounted, and a first driver 110 mounted on the support frame 100 and adapted to drive the installation frame 111, 112 to slide up and down along the vertical rail 113. A first end of the installation frame 111, 112 is connected to the first driver 110 and a second end of the installation frame 111, 112 opposite the first end is slidably mounted on the vertical rail 113. The installation frame 111, 112 includes a horizontal plate 112 and a vertical plate 111 connected between a first end of the horizontal plate 112 and the first driver 110. The vertical rail 113 is a vertical sliding rod. A sliding bush 114 is slidably sleeved on the vertical sliding rod. A second end of the horizontal plate 112 opposite the first end is connected to the sliding bush 114.

The rotation mechanism, as shown in FIGS. 1 and 2, comprises a rotation shaft 121 rotatably supported on the installation frame 111, 112 and a second driver 120 mounted on the installation frame 111, 112 and adapted to drive the rotation shaft 121 to rotate. The installation frame 111, 112 includes a pair of installation plates 117, 117 connected to the horizontal plate 112. Each end of the rotation shaft 121 is rotatably mounted on one of the pair of installation plates 117, 117. The second driver 120 is mounted on the vertical plate 111 of the installation frame 111, 112.

The grabbing mechanism 130, as shown in FIGS. 1 and 2, is connected to the rotation shaft 121 and comprises a gripper 131 adapted to grip the carrier 400. A second sensor 125 and a connection plate 124 are provided on the grabbing mechanism 130. The second sensor 125 is adapted to detect a state of the carrier 400 grabbed by the grabbing mechanism 130. The second sensor 125 is mounted on the connection plate 124.

Figure 4:
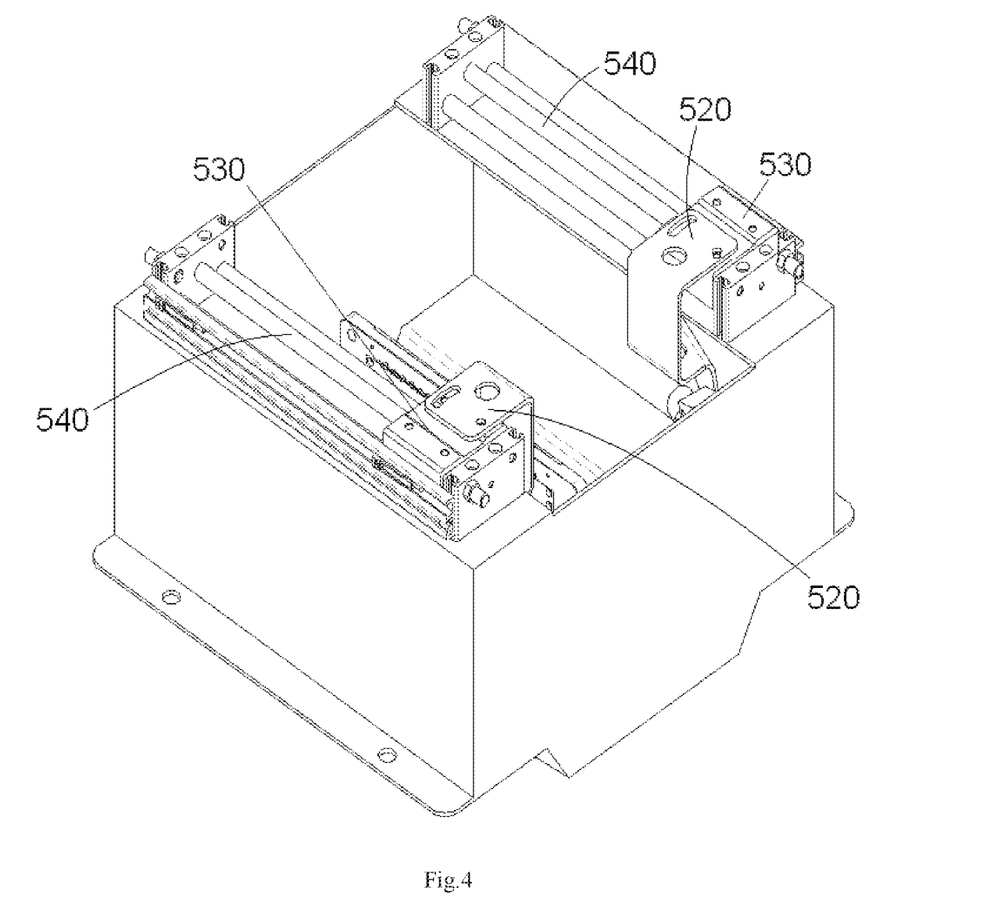
FIG. 4 is a perspective view of a pair of high pressure jet devices of the drying system.
Figure 5:
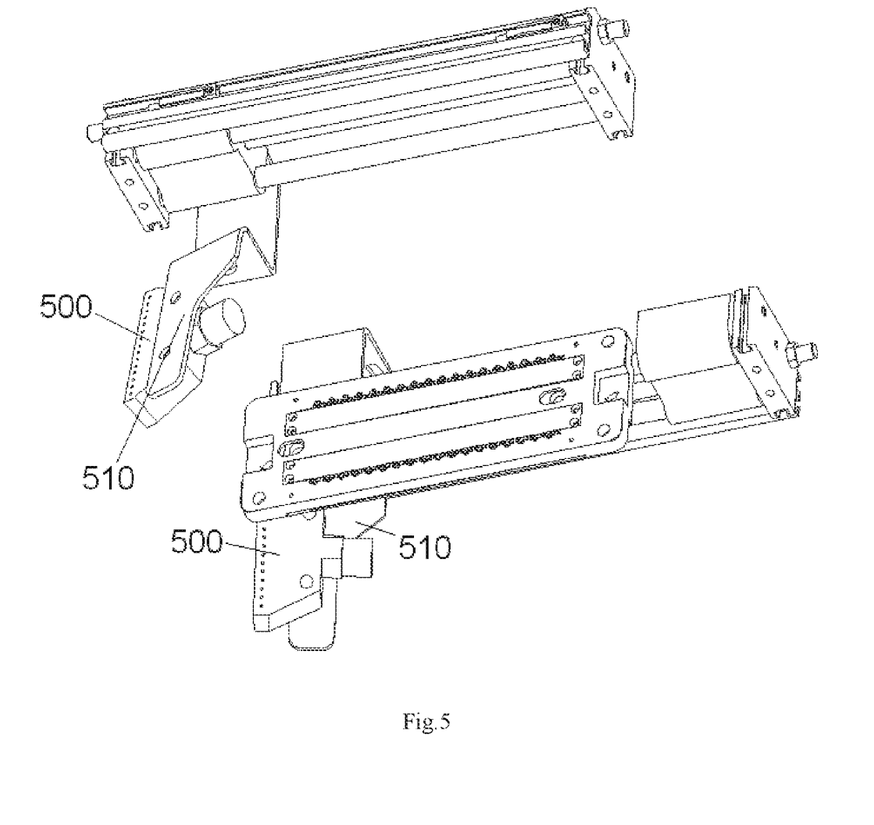
FIG. 5 is another perspective view of the pair of high pressure jet devices.

The high pressure jet device, as shown in FIGS. 3-5, comprises a horizontal moving device 530, 540 mounted on a top wall of the drying box 200 and a high pressure spray head 500 mounted on the horizontal moving device 530, 540. The high pressure spray head 500 extends into the drying box 200 to spray a high pressure gas onto the carrier 400 and the fiber optic ferrules 410 on the carrier 400, which are held in the drying box 200.

The horizontal moving device 530, 540 is configured to move the high pressure spray head 500 back and forth in a straight line in a horizontal direction. As shown in FIGS. 3-5, the horizontal moving device 530, 540 mainly comprises a horizontal rail 540 mounted on the top wall of the drying box 200, a sliding block 530 slidably mounted on the horizontal rail 540, and a third driver (not shown) configured to drive the sliding block 530 to move back and forth along the horizontal rail 540. A bracket 520 is mounted on the sliding block 530, and the high pressure spray head 500 is mounted on the bracket 520.

The bracket 520 is configured to be adjustable in its position, so that an angle of the high pressure spray head 500 with respect to the carrier 400 is adjustable. As shown in FIGS. 3-5, a circular hole 521 and an arc slot 522 are formed in the bracket 520. The circular hole 521 is aligned with an approximate center of the arc slot 522. The bracket 520 is connected to the sliding block 530 by two screws passing through the circular hole 521 and the arc slot 522, respectively. In this way, after loosening the two screws, the bracket 520 may be rotated around a center axis of the circular hole 521 within an angle range defined by the arc slot 522. As a result, the position of the bracket 520 may be adjusted by rotation.

In the embodiment shown in FIGS. 3-5, the drying system comprises two high pressure jet devices, which are constructed to simultaneously spray the high pressure gas to both a front side and a back side of the carrier 400, further improving the drying efficiency of the fiber optic ferrules 410.

In an embodiment, the drying system further comprises an air suction equipment connected to an exhaust port 210 of the drying box 200 and configured to suck gas and dust out of the drying box 200 through the exhaust port 210. Wet and hot air and the impurities in the drying box 200 are sucked out, further improving the drying efficiency. The drying box 200 has an inclined bottom wall; the exhaust port 210 is provided at a lowest location of the inclined bottom wall of the drying box 200. Residual liquid thereby smoothly flows to the exhaust port 210.

A drying process of the drying system will now be described in greater detail with reference to FIGS. 1-5.

The carrier 400, on which the plurality of fiber optic ferrules 410 are mounted, are first placed on the carrier support table 300. The carrier 400 is supported on the carrier support table 300 in the horizontal posture parallel to the horizontal plane.

The grabbing mechanism 130 is then moved up by the lift mechanism to move the gripper 131 of the grabbing mechanism 130 out of the drying box 200. The grabbing mechanism 130 is rotated to the horizontal posture by the rotation mechanism and moved down by the lift mechanism to move the grabbing mechanism 130 onto the carrier support table 300.

The carrier 400 to be dried is then grabbed from the carrier support table 300 by the grabbing mechanism 130. The grabbing mechanism 130 is moved up by the lift mechanism, the grabbing mechanism 130 is rotated to the vertical posture by the rotation mechanism, and the grabbing mechanism 130 is moved down by the lift mechanism so that the gripper 131 of the grabbing mechanism 130 and the grabbed carrier 400 are moved into and held in the drying box 200. In another embodiment, the grabbing mechanism 130 may grab a plurality of carriers 400 at one time, so as to further improve the drying efficiency of the fiber optic ferrules 410.

Then, the high pressure jet device is turned on, so that the dry high pressure gas is sprayed out of a row of nozzles, arranged vertically, of the high pressure spray head 500 to dry the carrier 400 and the fiber optic ferrules 410 on the carrier 400. The dry high pressure gas may be sprayed in a direction inclined to the surface of the carrier 400. The horizontal moving device 530, 540 is controlled to move the high pressure spray head 500 back and forth in a longitudinal direction of the carrier 400 while the high pressure spray head 500 is spraying the dry high pressure gas, so as to dry all fiber optic ferrules 410 on the carrier 400. The air suction equipment connected to the exhaust port 210 of the drying box 200 is operated to suck the wet and hot air and the impurities out of the drying box 200 while the fiber optic ferrules 410 are dried.

After the carrier 400 and the fiber optic ferrules 410 on the carrier 400 have been dried, the grabbing mechanism 130 is moved up by the lift mechanism, so as to move the carrier 400 grabbed by the grabbing mechanism 130 out of the drying box 200. The grabbing mechanism 130 and the carrier 400 grabbed by the grabbing mechanism 130 are rotated to the horizontal posture by the rotation mechanism.

The grabbing mechanism 130 is then moved down by the lift mechanism, so as to move the grabbing mechanism 130 onto the carrier support table 300. Finally, the grabbing mechanism 130 is released, so as to loosen the dried carrier 400 and place the carrier 400 on the carrier support table 300.

What is claimed is:

1. A drying system, comprising:
    a drying box;
    a carrier moving and holding device configured to move a carrier into the drying box and hold the carrier in the drying box, a plurality of fiber optic ferrules are mounted on the carrier, the carrier moving and holding device comprising:
        a grabbing mechanism adapted to grab the carrier;
        a moving mechanism adapted to rotate the carrier and move the carrier into the drying box; and
        a support frame configured to support the moving mechanism and the grabbing mechanism; and
    a high pressure jet device mounted in the drying box and adapted to spray a high pressure gas on the carrier held in the drying box to dry the fiber optic ferrules.

2. The drying system of claim 1, further comprising a carrier support table configured to support the carrier.

3. The drying system of claim 2, further comprising a first sensor provided on the carrier support table and configured to detect both whether the carrier is placed on the carrier support table and to detect a state of the carrier on the carrier support table.

4. The drying system of claim 3, wherein the grabbing mechanism is adapted to grab the carrier from the carrier support table and is adapted to place the carrier back on the carrier support table.

5. The drying system of claim 4, wherein the carrier is supported on the carrier support table in a horizontal posture parallel to a horizontal plane and the carrier is held in the drying box in a vertical posture parallel to a vertical plane during spraying the high pressure gas on the carrier.

6. The drying system of claim 5, wherein the moving mechanism comprises:
    a lift mechanism adapted to move the grabbing mechanism in a vertical direction to move the carrier grabbed by the grabbing mechanism into or out of the drying box; and
    a rotation mechanism adapted to rotate the grabbing mechanism to rotate the carrier grabbed by the grabbing mechanism to the horizontal posture or the vertical posture.

7. The drying system of claim 6, wherein the lift mechanism is mounted on the support frame, the rotation mechanism is mounted on the lift mechanism to rise or fall together with the lift mechanism, and the grabbing mechanism is mounted on the rotation mechanism to rotate with the rotation mechanism.

8. The drying system of claim 7, wherein the lift mechanism comprises:
    an installation frame;
    a vertical rail on which the installation frame is slidably mounted; and
    a first driver mounted on the support frame and adapted to drive the installation frame to slide up and down along the vertical rail.

9. The drying system of claim 8, wherein a first end of the installation frame is connected to the first driver and a second end of the installation frame opposite the first end is slidably mounted on the vertical rail.

10. The drying system of claim 9, wherein the installation frame comprises:
    a horizontal plate; and
    a vertical plate connected to a first end of the horizontal plate and the first driver.

11. The drying system of claim 10, wherein the vertical rail is a vertical sliding rod, a sliding bush is slidably sleeved on the vertical sliding rod, and a second end of the horizontal plate opposite the first end is connected to the sliding bush.

12. The drying system of claim 11, wherein the rotation mechanism comprises:
    a rotation shaft rotatably supported on the installation frame; and
    a second driver mounted on the installation frame and adapted to drive the rotation shaft to rotate.

13. The drying system of claim 12, wherein the installation frame further comprises a pair of installation plates connected to the horizontal plate, each of a pair of opposite ends of the rotation shaft are rotatably mounted on one of the pair of installation plates, and the second driver is mounted on the vertical plate of the installation frame.

14. The drying system of claim 13, wherein the grabbing mechanism is connected to the rotation shaft and includes a gripper adapted to grip the carrier.

15. The drying system of claim 14, further comprising a second sensor provided on the grabbing mechanism and adapted to detect a state of the carrier grabbed by the grabbing mechanism.

16. The drying system of claim 15, wherein a connection plate is provided on the grabbing mechanism and the second sensor is mounted on the connection plate.

17. The drying system of claim 1, wherein the high pressure jet device comprises:
    a horizontal moving device mounted on a top wall of the drying box; and
    a high pressure spray head mounted on the horizontal moving device, the horizontal moving device is configured to move the high pressure spray head back and forth in a straight line.

18. The drying system of claim 17, wherein the horizontal moving device comprises:
    a horizontal rail mounted on the top wall of the drying box;
    a sliding block slidably mounted on the horizontal rail; and
    a driver configured to drive the sliding block to move back and forth along the horizontal rail.

19. The drying system of claim 18, wherein a bracket is mounted on the sliding block and the high pressure spray head is mounted on the bracket.

20. The drying system of claim 19, wherein a position of the bracket is configured to be adjustable such that an angle of the high pressure spray head is adjustable with respect to the carrier.

21. The drying system of claim 20, wherein a circular hole and an arc slot are formed in the bracket, the circular hole is positioned approximately at a center of the arc slot, and the bracket is connected to the sliding block by a screw passing through each of the circular hole and the arc slot.

22. The drying system of claim 21, wherein the drying system includes a pair of high pressure jet devices configured to spray the high pressure gas on both a front side and a back side of the carrier.

23. The drying system of claim 1, further comprising an air suction equipment connected to an exhaust port of the drying box and configured to suck gas and dust out of the drying box.

24. The drying system of claim 23, wherein the drying box has an inclined bottom wall and the exhaust port is provided at a lowest location of the inclined bottom wall.

\* \* \* \* \*